United States Patent [19]
Larson et al.

[11] Patent Number: 5,857,387
[45] Date of Patent: *Jan. 12, 1999

[54] NUBBED GRIP FOR ROTATABLE BICYCLE GEAR SHIFTER

[75] Inventors: Michael W. Larson, Chicago; Andrew J. Caron, Lyons; John David Cheever, Chicago; Tymme A. Laun, Chicago; Tyler D. Duston, Chicago, all of Ill.

[73] Assignee: SRAM Corporation, Chicago, Ill.

[*] Notice: The term of this patent shall not extend beyond the expiration date of Pat. No. 5,564,316.

[21] Appl. No.: 838,273

[22] Filed: Apr. 17, 1997

Related U.S. Application Data

[62] Division of Ser. No. 730,352, Oct. 15, 1996, which is a continuation of Ser. No. 330,285, Oct. 27, 1994, Pat. No. 5,564,316, which is a continuation-in-part of Ser. No. 287,721, Aug. 9, 1994, Pat. No. 5,584,213, which is a continuation-in-part of Ser. No. 207,249, Mar. 7, 1994, Pat. No. 5,476,019.

[51] Int. Cl.⁶ .......................... B62K 23/04; B62K 21/26
[52] U.S. Cl. ........................................ 74/551.9; 74/489
[58] Field of Search ...................... 74/551.9, 551.8, 74/551.1, 558, 489, 488; D8/303

[56] References Cited

U.S. PATENT DOCUMENTS

| D. 278,879 | 5/1985 | Hwung . | |
|---|---|---|---|
| 4,308,762 | 1/1982 | Jannard | 74/551.9 |
| 4,938,733 | 7/1990 | Patterson . | |

FOREIGN PATENT DOCUMENTS 5-32191  2/1993  Japan .

*Primary Examiner*—Charles A. Marmor
*Assistant Examiner*—Mary Ann Battista
*Attorney, Agent, or Firm*—Jefferson Perkins Foley & Lardner

[57] ABSTRACT

Nubbed grips for hand-rotatable bicycle gear shifters have longitudinally elongated groups of nubs (50) that are angularly spaced apart by valley regions (44). Preferably, the elastomeric nubs are formed both on a cylindrical portion and an adjacent flanged portion of the grip.

6 Claims, 5 Drawing Sheets

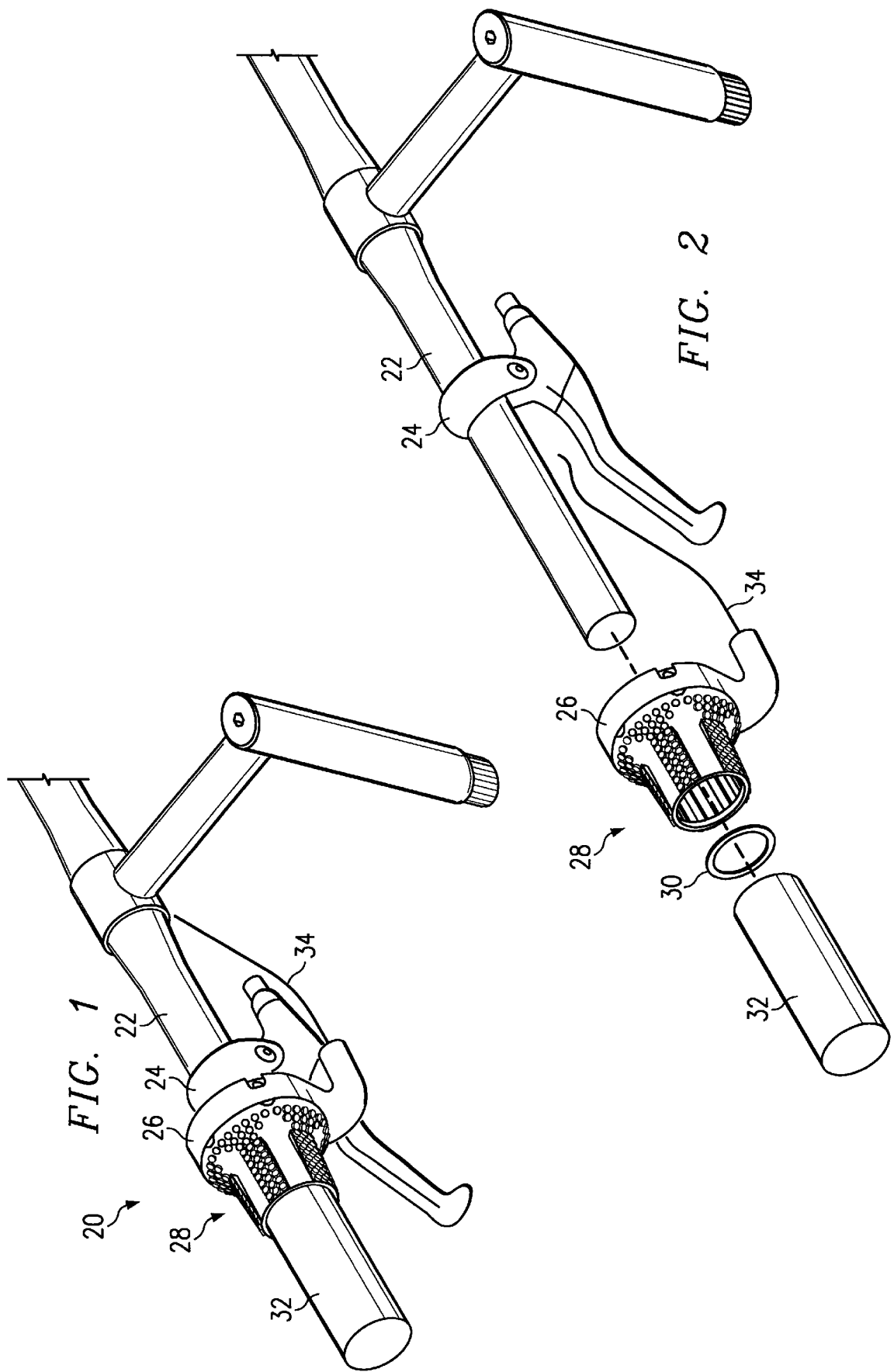

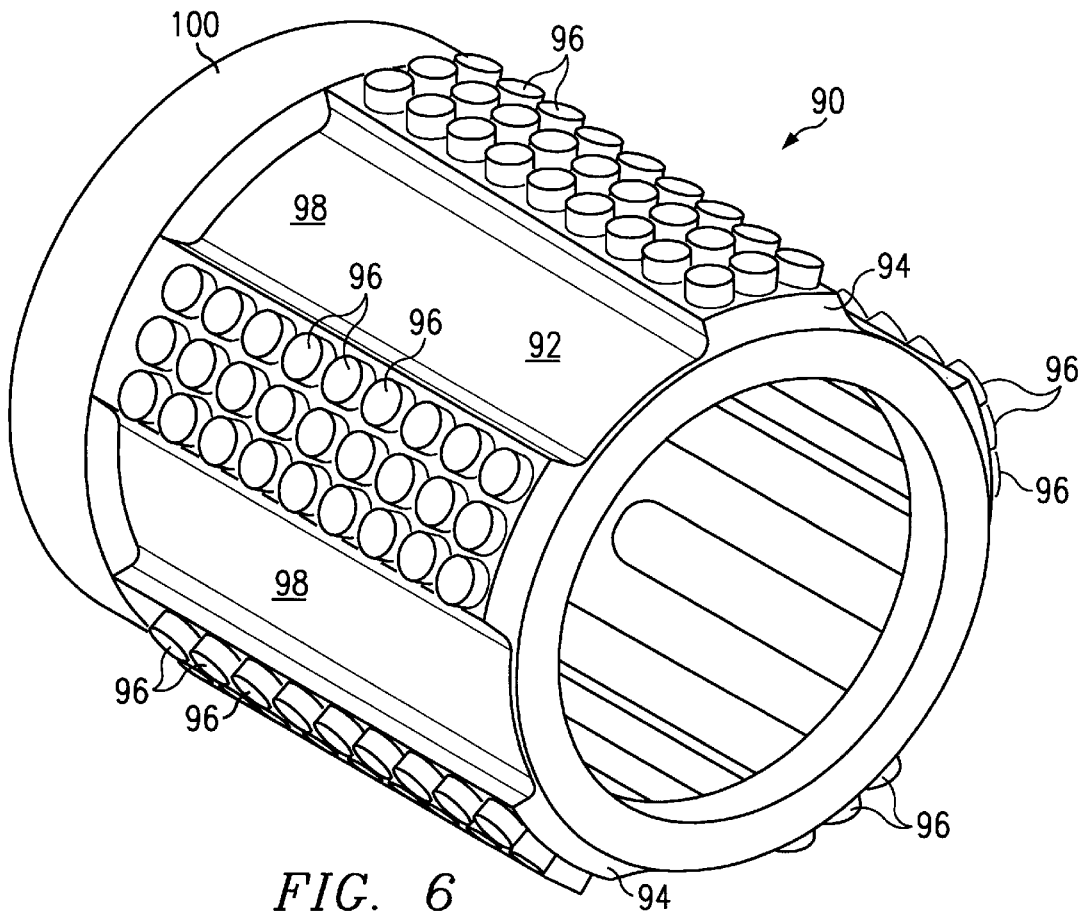
FIG. 6
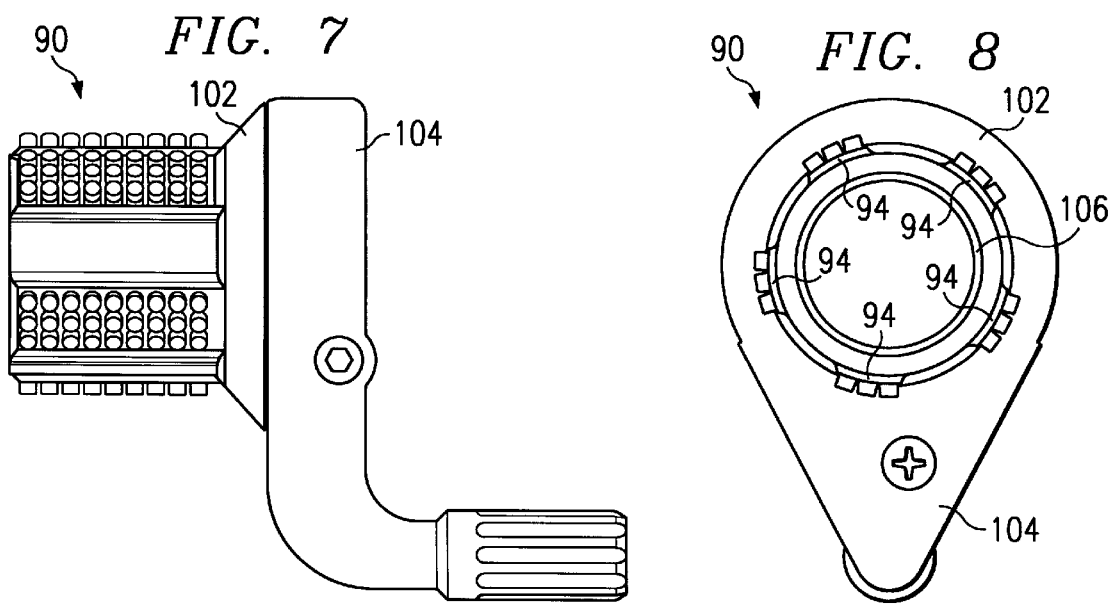
FIG. 7
FIG. 8

NUBBED GRIP FOR ROTATABLE BICYCLE GEAR SHIFTER

RELATED APPLICATIONS

This application is a divisional of application Ser. No. 08/730,352 filed on Oct. 15, 1996, which is a continuation of application Ser. No. 08/330,285 filed Oct. 27, 1994, now U.S. Pat. No. 5,564,316, which in turn is a continuation-in-part of application Ser. No. 08/287,721 filed Aug. 9, 1994, now U.S. Pat. No. 5,584,213, which in turn is a continuation-in-part of application Ser. No. 08/207,249 filed Mar. 7, 1994, now U.S. Pat. No. 5,476,019. The application and patents are fully incorporated by reference herein.

TECHNICAL FIELD OF THE INVENTION

The present invention relates in general to gear shifters, and more particularly to a handlebar-mounted rotatable gear shifter designed to ergonomically fit the joints and lands of a rider's hand and to optimally transmit torque from the rider's hand to the gear shifter.

BACKGROUND OF THE INVENTION

Hand-rotatable bicycle gear shifters have been developed as replacements for the older lever-actuated shifters, especially for use in conjunction with off-road or "mountain" bicycles. Hand-rotatable shift actuators are disclosed, for example, in U.S. Pat. No. 4,900,291 issued Feb. 13, 1990; U.S. Pat. No. 4,938,733 issued Jul. 3, 1990; U.S. Pat. No. 5,102,372 issued Apr. 7, 1992; and U.S. Pat. No. 5,197,927 issued Mar. 30, 1993. All of these patents are assigned to the assignee of this application. In each of the foregoing patents, a bicycle derailleur is actuated by a rotatable grip which is located on the handlebar of the bicycle inboard of the normal handgrip. Prior to this invention, the gripping surface of rotatable grips sold by the assignee of this application was typically formed of foam rubber or neoprene, was secured to an underlying rotatable member of the gear shifter assembly, and typically had a smooth outer surface.

The assignee has experimented with hand-rotatable grips with axially extending ribs where the grips were formed of a hard plastic material such as ABS; these grips were less than optimal in that they presented harsh sharp edges to the operator's hand. These edges were uncomfortable to the rider especially in those conditions involving uneven surfaces, as occasionally experienced on most roads but presenting an especially acute problem for off-the-road bicycle travel. Also, these prior rotatable grips of the assignee tended to become slippery when fouled by mud and the like, reducing the amount of torque capable of being applied by the rider. A need therefore exists for improved grips with optimum torque-transmission and antifouling features which are adapted to be incorporated into a hand-rotatable gear shifter.

SUMMARY OF THE INVENTION

The inventors have observed that as wrapped around a cylindrical shape, the hand naturally has several crooks and lands. According to one aspect of the invention, therefore, a grip for a rotatable gear shifter disposes longitudinally elongated groups of elastomeric nubs on a generally cylindrical surface of the grip such that the nubs are angularly spaced from each other. Preferably, a first of the nub groups is disposed adjacent the joint between the distal phalanx and the middle phalanx of the forefinger of a hand of the rider when gripping the grip, a second of the nub groups is disposed adjacent the joint between the middle phalanx and the proximal phalanx of the forefinger of that hand, and a third of the nub groups is disposed adjacent the joint between the proximal phalanx and the metacarpal phalanx of the forefinger. More preferably, a fourth of the nub groups is disposed adjacent the joint between the proximal phalanx and the metacarpal of the thumb of the rider's hand.

According to another aspect of the invention, the body of the grip includes first and second portions, with the first portion being formed substantially as a cylinder (it may have a degree of taper) and the second portion having a large radius at one of its ends which is substantially greater than a small radius thereof, the small radius being adjacent to the first portion. Nubs are formed on the surface of this second or flange portion in order to increase frictional force and therefore the torque capable of being applied by the rider. This second or flange portion may for example take a frustoconical shape.

The present invention provides a technical advantage in that it offers a comfortable grip for the rider's hand which nonetheless maximizes the amount of torque which may be transmitted from the rider to the gear shifter even in muddy or other adverse conditions.

BRIEF DESCRIPTION OF THE DRAWINGS

Other aspects of the invention and their advantages will be discerned from the following detailed description, in which like characters denote like parts, and in which:

FIG. 1 is an isometric view of a portion of a bicycle handlebar on which is mounted a hand-rotatable gear shifter as incorporating a first embodiment of a grip according to the invention;

FIG. 2 is an exploded view of the hand-rotatable gear shifter and associated handlebar grip shown in FIG. 1;

FIG. 6 is an isometric view of a second embodiment of a grip according to the invention;

FIG. 7 is an elevational view of the grip shown in FIG. 6, as incorporated into a gear shifter assembly;

FIG. 8 is an end-on elevational view of the hand-rotatable gear shifter assembly shown in FIG. 7;

DETAILED DESCRIPTION OF THE INVENTION

Figure 3:
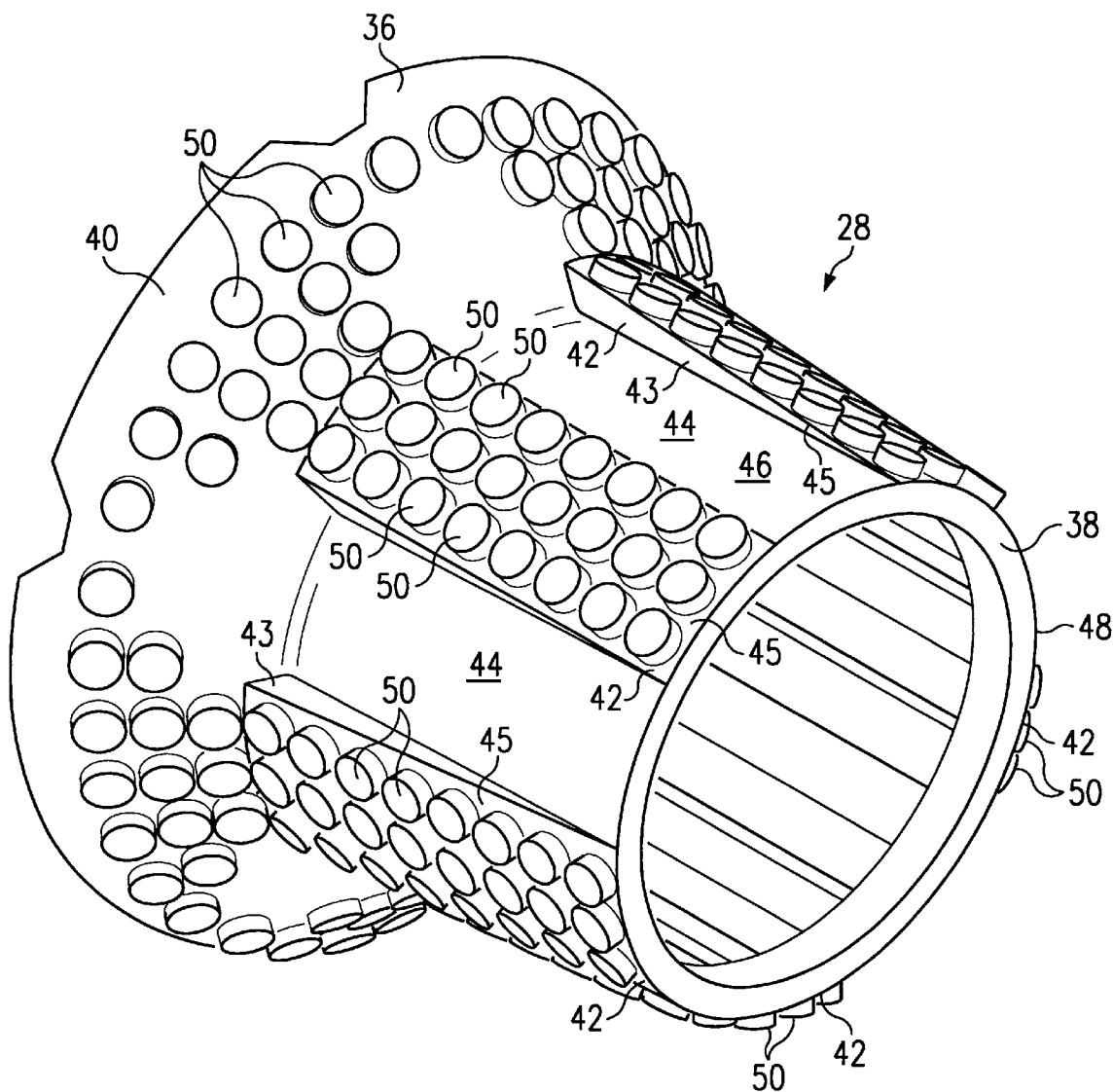
FIG. 3 is a detailed isometric view of the first embodiment of the grip.

Referring first to FIGS. 1 and 2, a hand-rotatable gear shifter assembly is indicated generally at 20 as mounted on a handlebar 22 of a bicycle. As previously noted, the invention is especially suited for the shifting of derailleurs on off-the-road or "mountain" bikes, although it may be advantageously applied to any bicycle or other wheeled vehicle requiring the hand actuation of a cable-linked transmission between at least two gears. In order of assembly, in the illustrated embodiment a hand-applied caliper brake lever 24 is clamped to the handlebar 22 followed by the gear shifter assembly 20, which is assembled as a unit prior to its installation on the handlebar 22. A housing 26 of the assembly 20 is fixed in place with respect to the handlebar 22, while a grip indicated generally at 28 rotates about the handlebar axis. The grip 28 is carried by a cylindrical rotating member (not shown) which rotates on a corresponding coaxial mandrel (not shown) that is fixed with respect to handlebar 22. To complete the installation, a slip ring 30 is slipped over the handlebar 22, followed by an outboard nonrotatable handgrip 32.

The gear shifter assembly 20 is one terminus of a Bowden gear shifting cable. Conventionally, the Bowden cable includes a sheath or tube (not shown) in which a strong, flexible cable 34 is axially displaced toward or away from assembly 20 by rotating the grip 28. A front or rear derailleur (not shown) typically is the other terminus of the Bowden cable 34. The axial displacement of the cable 34 up or down its length will cause the derailleur to shift gears between adjacent sprockets or chainrings associated with the derailleur. For the purpose of appreciating the invention, it is also important to note that cable 34 is under a continuous tension that in a typical embodiment is provided by a tensioning spring of the derailleur (not shown).

In a hand-rotatable gear shifter 20 of the kind which advantageously incorporates the invention, the rotation of the grip 28 causes the cable 34 to be pulled up or let out around a spool or cam which is disposed in the housing 26. This may be accomplished in any of several ways which are peripheral to the invention described herein; examples may be found in commonly assigned U.S. Pat. Nos. 5,197,927 and 5,102,372, which are fully incorporated by reference herein.

The grip of the invention has application to any hand-rotatable gear shifter. Such gear shifters typically are indexed to a plurality of predetermined positions by spring-loaded detents that are tactilely experienced by the rider; in order to shift from one gear to the next, the rider rotates the grip from one detent to the next. To hold the cable against the tensioning force of the derailleur spring, the shifter is designed to require a certain minimum but substantial amount of torque to escape a particular detent in the cable releasing direction and be rotated to the next detent. Escaping a detent in the cable—pulling direction is made easier by design, to compensate for the fact that the rider is rotating against the force of the derailleur spring; the overall resistance is roughly comparable.

The invention could also have application to a friction-type gear shifter in which there are no preselected detents. A considerable amount of torque would have to be applied to the grip 28 in order to properly actuate such a shifter in the cable pulling direction. The gear shifter internal rotational friction would have to be at least equal to the amount of force exerted by the derailleur tensioning spring, and the torque necessary to rotate the shifter in a cable-pulling direction would have to exceed this.

Either the friction or the detent type of shifter requires the shifter to exhibit a predetermined amount of resistance to torque before it begins turning in a cable-releasing direction. Absent such a minimum predetermined amount of torque, the bicycle would not stay in the desired gear.

Under either scheme, therefore, the amount of frictional force which a rider's hand can apply to the grip 28, and the amount of torque which can be developed on the grip 28 with respect to the mandrel (not shown) on which grip 28 is mounted, should be maximized.

FIG. 3 is a detailed isometric view of a first embodiment of the grip 28 according to the invention. It is preferred that an exterior surface 36 of the grip 28 be formed of an elastomeric material for comfort to the rider's hand and for certain torque optimizing characteristics. One particularly preferred material is KRATON®, a thermoplastic elastomer manufactured by Shell. The grip 28 is designed to be stretch-fitted over a rigid cylindrical member (not shown) which in turn rotates with respect to the mandrel (not shown) that is fixed in place with respect to the bicycle handlebar 22.

In the embodiment illustrated in FIG. 3, the grip 28 has two portions: a substantially cylindrical (and preferably slightly tapered) portion 38 and a second portion or flange 40 which is integrally formed with the first portion 38. The cylindrical portion 38 has formed thereon a plurality of longitudinally extending ribs 42 that are angularly spaced apart from one another by a like plurality of valley regions 44. The valley regions 44 extend throughout the length of the generally cylindrical portion 38, and extend into the second flanged portion 40. It is preferred that the number of ribs 42 be between four and six inclusive and more preferably five. Each of the ribs 42 has sidewalls 43 which project radially outwardly from a general surface 46 of the cylindrical portion 38 to an end or outer surface 45 of the rib 42. As measured from the axis of rotation, the outer or end surfaces 45 of the ribs 42 may be at a radius in the range of 0.5 to 0.9 inches. The surface 46 may be slightly tapered, as shown. In the illustrated embodiment, the amount of radial outward projection of each rib 42 varies linearly as a function of the distance from an outboard end 48 of the cylindrical portion 38. It is further preferred that the angular extent of the valley regions 44 be approximately the same as the angular extent of the ribs 42 which they space apart.

Each of the ribs 42 has formed on its outer or end surface 45 thereof a population or array of upstanding features or nubs 50. The ribs 42 act to radially elevate the nubs 50, such that the torque transmitted to the grip 28 is a function of the sum of the radius of the outer surface 45 of the ribs 42 plus the height of the nubs.

The ribs 42 and the upstanding features 50 are formed of an elastomeric material, and conveniently are integrally formed from the same elastomeric material forming the rest of the grip 28. The features 50 are preferably formed in a two-dimensional matrix, with both dimensions being tangential to the generally cylindrical surface 46. The width and the spacing of the features 50 are chosen such that the distance between each of the features 50 is less than or equal to the width of any one feature 50. This maximizes the number of traction or abutting edges that are available to the hand for torque transmission, with each feature 50 presenting at least one upstanding traction edge to the hand. In the embodiment illustrated in FIGS. 1–5, the features 50 take the form of relatively squat cylinders having a height which is less than or equal to their width. Other upstanding features could also be employed. The nubs 50 may, for example, have a diameter in the range of 0.05 to 0.2 inches inclusive.

As using the squat cylindrical nubs illustrated in FIG. 3, for example, the operating surface for grip 28 is preferred to have the following dimensions (given in inches):

Rib length: 1.1–1.3
Rib width at the top: 0.36–0.38
Rib width at the bottom: 0.38–0.4
Rib height: 0.040–0.050
Space between ribs: 0.41–0.43

Nub diameter: 0.100

Nub spacing between centers: 0.11–0.130

Nub height: 0.040–0.050

As installed on a bicycle, the flange portion 40 is disposed adjacent the housing 26, as is shown in FIG. 1. The grip 28 of the invention takes advantage of the enlarged diameter of the housing 26 by providing nubs 50 on the flange 40 as well as on the cylindrical portion 38. The nubs 50 will engage additional surfaces of the thumb and forefinger of the hand of the rider and will increase the amount of frictional force experienced by the rider. Because the side surface of the hand which engages flange portion 40 has no substantial crooks or lands (described in conjunction with FIG. 4), the nubs 50 on portion 40 include at least one continuous circumferential ring of nubs. The flange portion 40 in general can conform to any of several surfaces of rotation, including a frustoconical surface. The profile of flange 40 should vary smoothly between the inboard end of grip 28 and its junction with portion 38. By applying an axial inboard force against the nubs 50 on flange portion 40 with his or her hand, the rider is able to develop additional friction between the flange 40 and the hand. The nubbed flange 40 therefore allows the transmission of additional torque to the grip 28.

Figure 4:
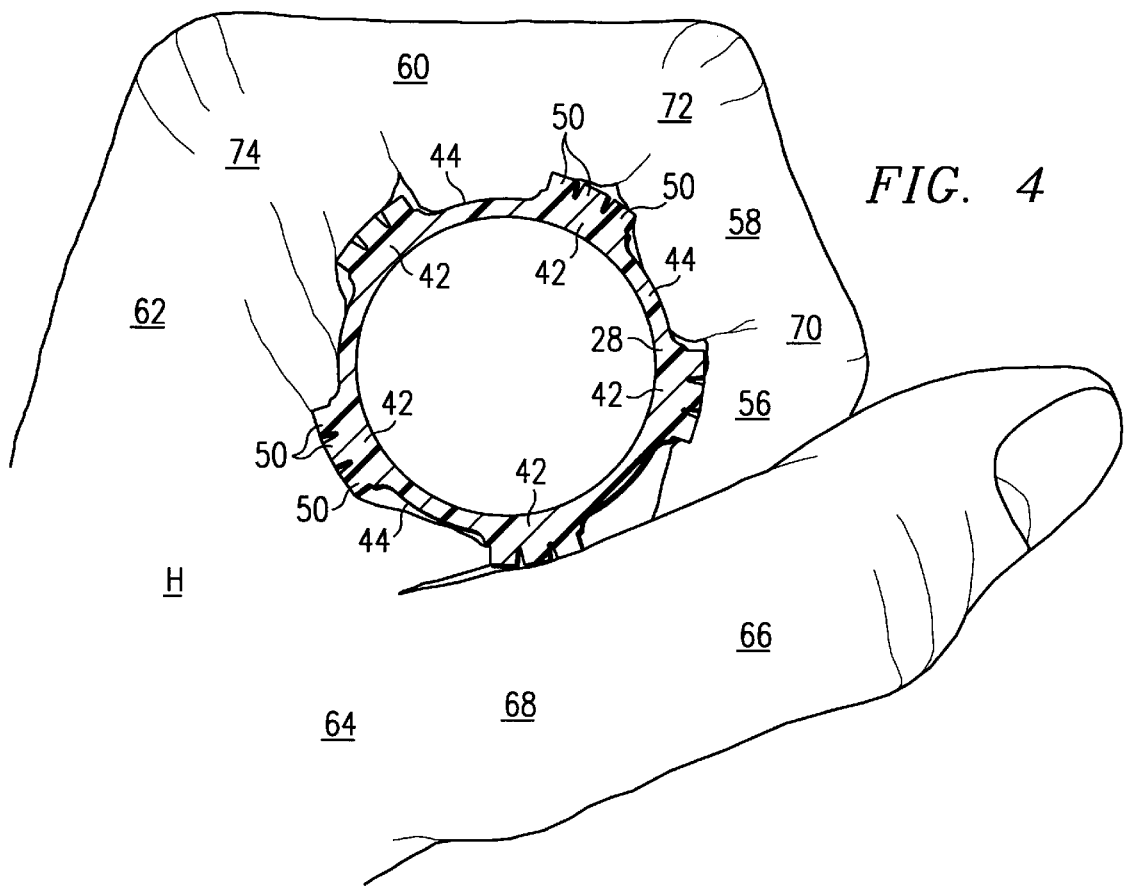
FIG. 4 is a part elevational, part sectional view of a cylindrical portion of the grip shown in FIG. 3 as being grasped by the left hand of a rider.

FIG. 4 illustrates the ergonomic arrangement which obtains when the hand of a rider engages the grip 28. As grasping the grip 28, the hand H forms several crooks and lands which may be taken advantage of by the grip of the invention. The rider is thereby able to exert an additional degree of torque; the advantage obtained may be compared with the advantage obtained by providing a wrench for a hexagonal nut. The bones of the forefinger of the hand H include a distal phalanx 56, a middle phalanx 58, a proximal phalanx 60 and a metacarpal 62. Similar bones (and the softer tissues surrounding them) of the middle and sometimes even the fourth finger (neither shown) will also grasp cylindrical section 38 of the grip. Engaging bones of the thumb include the metacarpal 64 and the proximal phalanx 66. A phalango-metacarpal joint 68 occurs between the proximal phalanx and the metacarpal of the thumb. In like manner, joints 70, 72 and 74 are formed, respectively, between the distal and the middle phalanges of the forefinger, the middle and proximal phalanges of the forefinger, and the proximal phalanx and the metacarpal of the forefinger.

The bone structure of the human hand, as bent in position around the grip 28, forms several natural crooks which correspond to each of the foregoing joints. In between these crooks are flats or lands which provide the gripping surface of the hand when grasping a cylindrical object. It has been discovered that providing five ribs 42 and preselecting a grip diameter to be of a certain size allows an approximate fit of each of the ribs 42 to a respective joint 70, 72, 74 or 68. The valley regions 44 in between the ribs 42 then form natural surfaces for the engagement of the lands or contact surfaces of the hand in between these crooks. This arrangement maximizes the amount of torque which a rider may apply to the shifter grip 28 before slipping occurs.

Figure 5A:
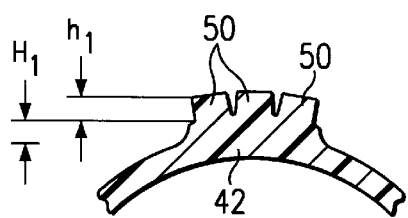
FIGS. 5a and 5b are details showing deformation of ribs and nubs upon application of torque.
Figure 5B:
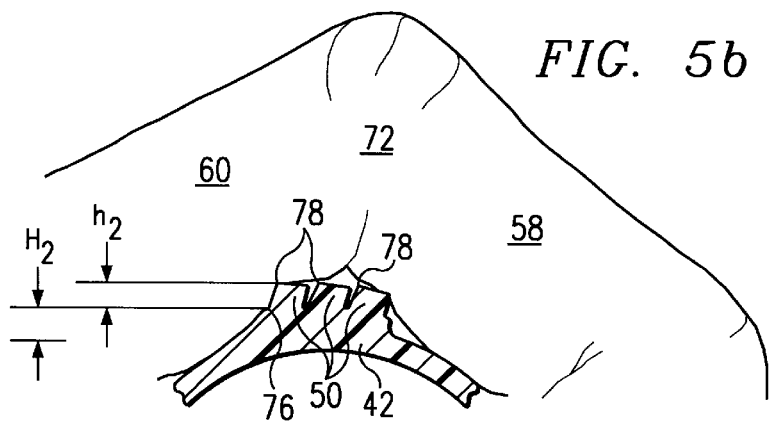

The provision of an elastomeric material to form the surface of the grip 28 also has the following torque-enhancing advantage best illustrated in the schematic detail shown in FIGS. 5a and 5b. FIG. 5a shows a rib 42 and nubs 50, in an unstressed condition during which the height of the ribs 42 will be $H_1$ and the height of the nubs 50 will be $h_1$. When the hand of the rider applies torque to the rib 42 and the nubs 50, both the rib 42 and the nubs 50 will begin to deform. As illustrated in FIG. 5b, a leading edge 76 of the rib 42 will begin to be raised, as will leading edges 78 of the nubs 50. This in turn will cause increases in the heights of the rib and nubs to $H_2$ and $h_2$ in comparison with the unstressed heights $H_1$ and $h_1$. The increased height will produce even greater torque since the torque is directly related to the radius at which the force is applied from the axis of rotation.

A second embodiment of a grip according to the invention is illustrated at 90 in FIGS. 6–8. In this embodiment, the gripping surface is generally cylindrical in shape (or slightly frustoconical) throughout its length. Upstanding from the general cylindrical surface 92 are five ribs 94, each of which has on an outer surface thereof a matrix of upstanding elastomeric nubs 96. The ribs 94 are separated by valley regions 98, as before. The height of the ribs 94 with respect to the generally cylindrical surface 92 remains substantially constant throughout the length of the grip, although ribs 94 may taper slightly between the inboard and outboard ends. Ribs 94 and the generally cylindrical surface 92 terminate in a flange 100 which is received underneath a flange 102 of a housing 104 (FIG. 7). As before, the grip 90 is carried on a rotating member 106 (FIG. 8) which in turn rotates on a mandrel (not shown) that is fixed with respect to the bicycle handlebar.

Figure 9:
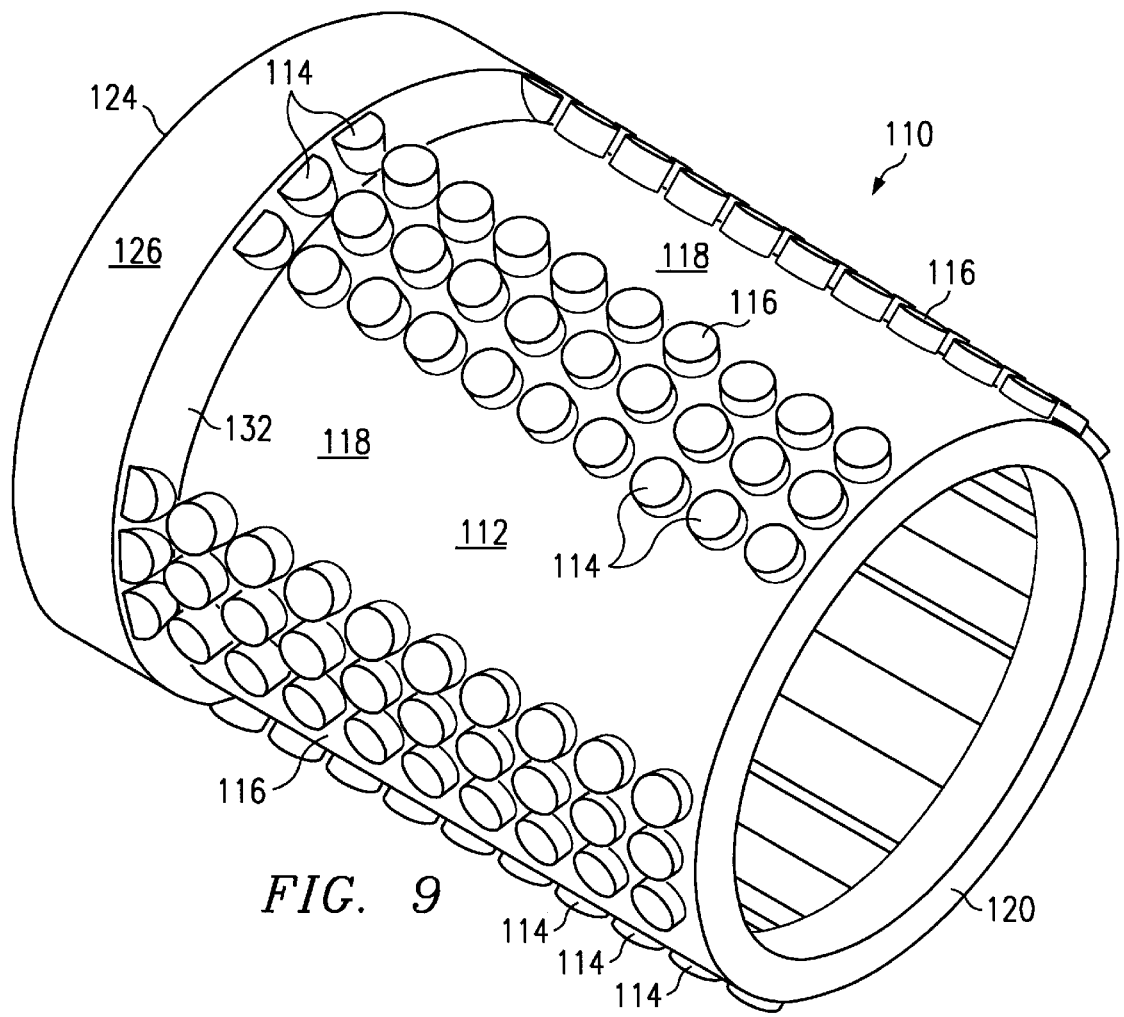
FIG. 9 is an isometric view of a third embodiment of a grip according to the invention.
Figure 10:
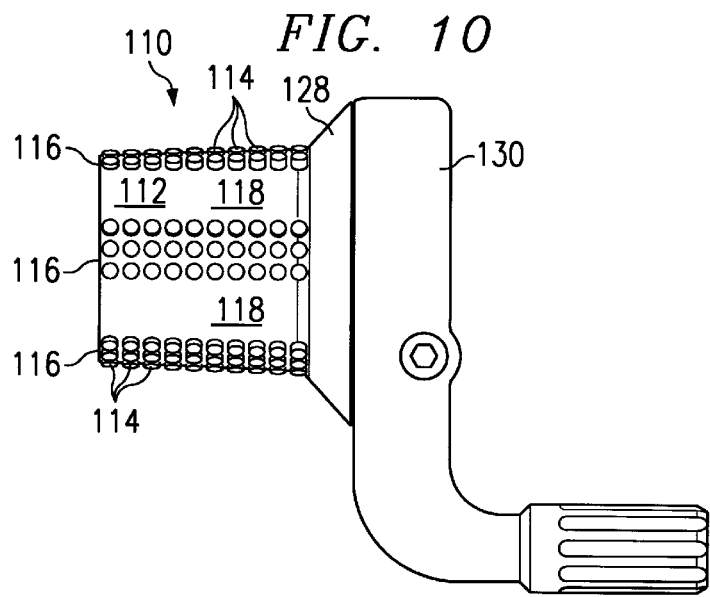
FIG. 10 is an elevational view of the grip shown in FIG. 9, as incorporated into a hand-rotatable gear shifter assembly.
Figure 11:
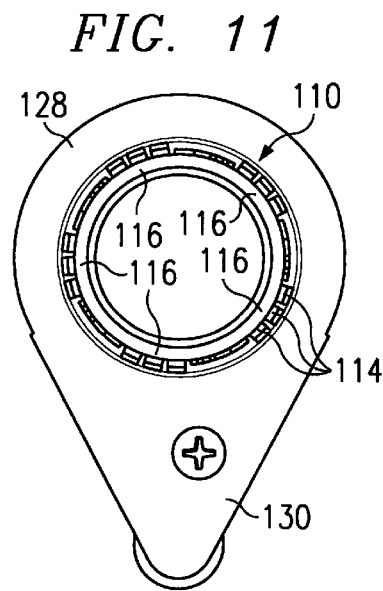
FIG. 11 is an end-on elevational view of the assembly shown in FIG. 10.

FIGS. 9–11 illustrate yet another embodiment of the invention. In this embodiment, a grip indicated generally at 110 has a generally cylindrical surface 112 (which may be slightly frustoconical or tapered) throughout its gripping length. A plurality of nubs 114 are arranged in five zones, matrices or groups 116 spaced equidistantly around the circumference of the grip 110. Unlike the prior embodiments, however, the nubs 114 are not mounted on ribs but instead are formed directly on the generally cylindrical surface 112. Five valley regions 118, on which no nubs 114 are formed, angularly space apart the nub groups 116.

On grip 110, the nubs 114 have a relatively small height near the outboard end 120 of the grip 110 and a relatively large height nearest the inboard end 124. The grip 110 terminates in an inboard flange 126 which (FIGS. 10 and 11) fits underneath a housing flange 128 of the gear shifter assembly 130. An intermediate frustoconical flange 132 joins the generally cylindrical surface 112 of the grip 110 with the inboard flange 126. A farthest-inboard file or circle of nubs 114 are formed on this intermediate flange 132 as well. In this way, the nubs 114 form a linear transition between the flange 126 and the cylindrical surface of the outboard handlebar grip 32 (see FIG. 1).

In summary, novel grips for hand-rotatable bicycle gear shifters have been disclosed and illustrated which provide nubbed surfaces for good retention of torque transmission under adverse environmental conditions, and which optimize the transmission of torque by being ergonomically fitted to a rider's hand. While preferred embodiments and their advantages have been described in the above detailed description, the invention is not limited thereto but only by the scope and spirit of the appended claims.

What is claimed is:

1. A bicycle gear shifter for mounting to a handlebar of a bicycle, comprising:

a stationary member for coaxial affixation to the handlebar of the bicycle, the stationary member having an inboard portion with a radius;

a rotatable member mounted on the stationary member to be outboard of the inboard portion of the stationary member and rotatable relative to the stationary member and rotatable around an axis, said rotatable member adapted to be rotatable in a clockwise direction and in a counterclockwise direction by a hand of a rider of the bicycle;

a grip of the rotatable member formed around said axis and having longitudinally opposed first and second ends, the first end disposed inboard relative to the second end and disposed adjacent the inboard portion of the stationary member;

a first portion of said grip formed to be substantially radially symmetrical about said axis;

a second portion of said grip formed to be substantially radially symmetrical about said axis, said second portion interposed between said first end of said grip and said first portion, a large radius of said second portion adjacent said first end of said grip, a small radius of said second portion being adjacent said first portion, said large radius being larger than said small radius, said large radius being substantially equivalent to the radius of the inboard portion of the stationary member, a surface of said second portion extending from said large radius to said small radius; and a plurality of upstanding nubs formed on said second portion to enhance transmission of torque from the hand of the rider to the bicycle gear shifter.

2. The bicycle gear shifter of claim 1, wherein said first portion of said grip is substantially cylindrical.

3. The bicycle gear shifter of claim 1, wherein a surface of said first portion of said grip is substantially a frustoconical section and said surface of said second portion of said grip is substantially a frustoconical section, an angle of slope of said surface of said second portion of said grip relative to said axis being greater than an angle of slope of said surface of said first portion of said grip relative to said axis.

4. The bicycle gear shifter of claim 1, wherein said nubs are elastomeric.

5. The bicycle gear shifter of claim 1, wherein said nubs are cylindrically-shaped.

6. The bicycle gear shifter of claim 1, wherein said surface of said second portion of said grip is frustoconical.

* * * * *